Sept. 24, 1940.   C. R. YOUNG   2,215,631
STOCK LOADING AND UNLOADING DEVICE
Filed May 15, 1940   4 Sheets-Sheet 4
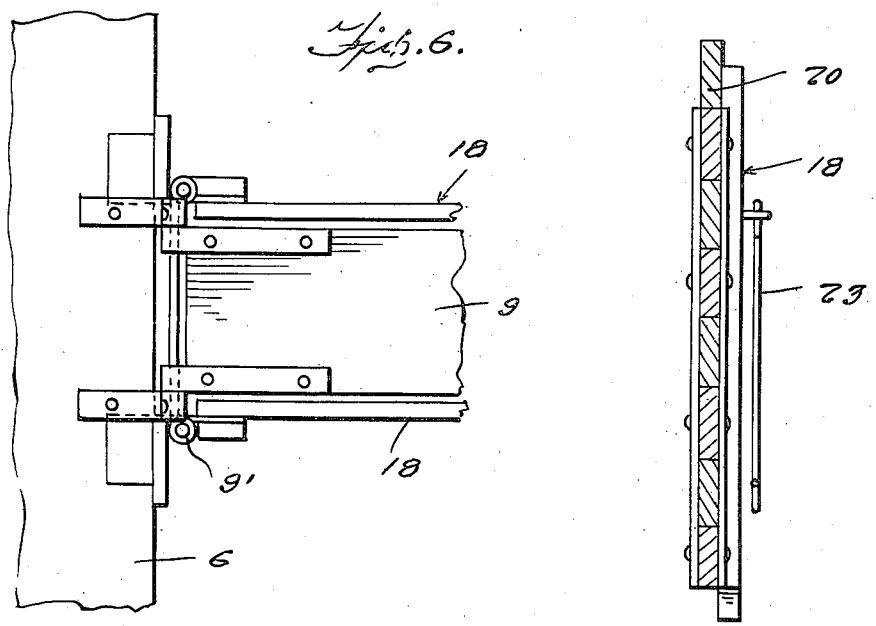
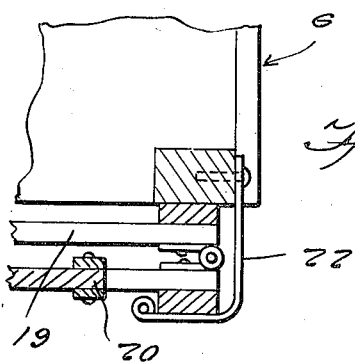
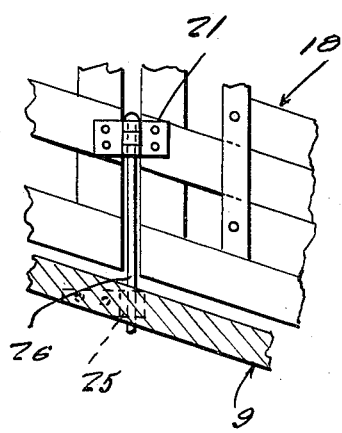
Inventor
Charles Ray Young
By Clarence A. O'Brien
Attorney Patented Sept. 24, 1940

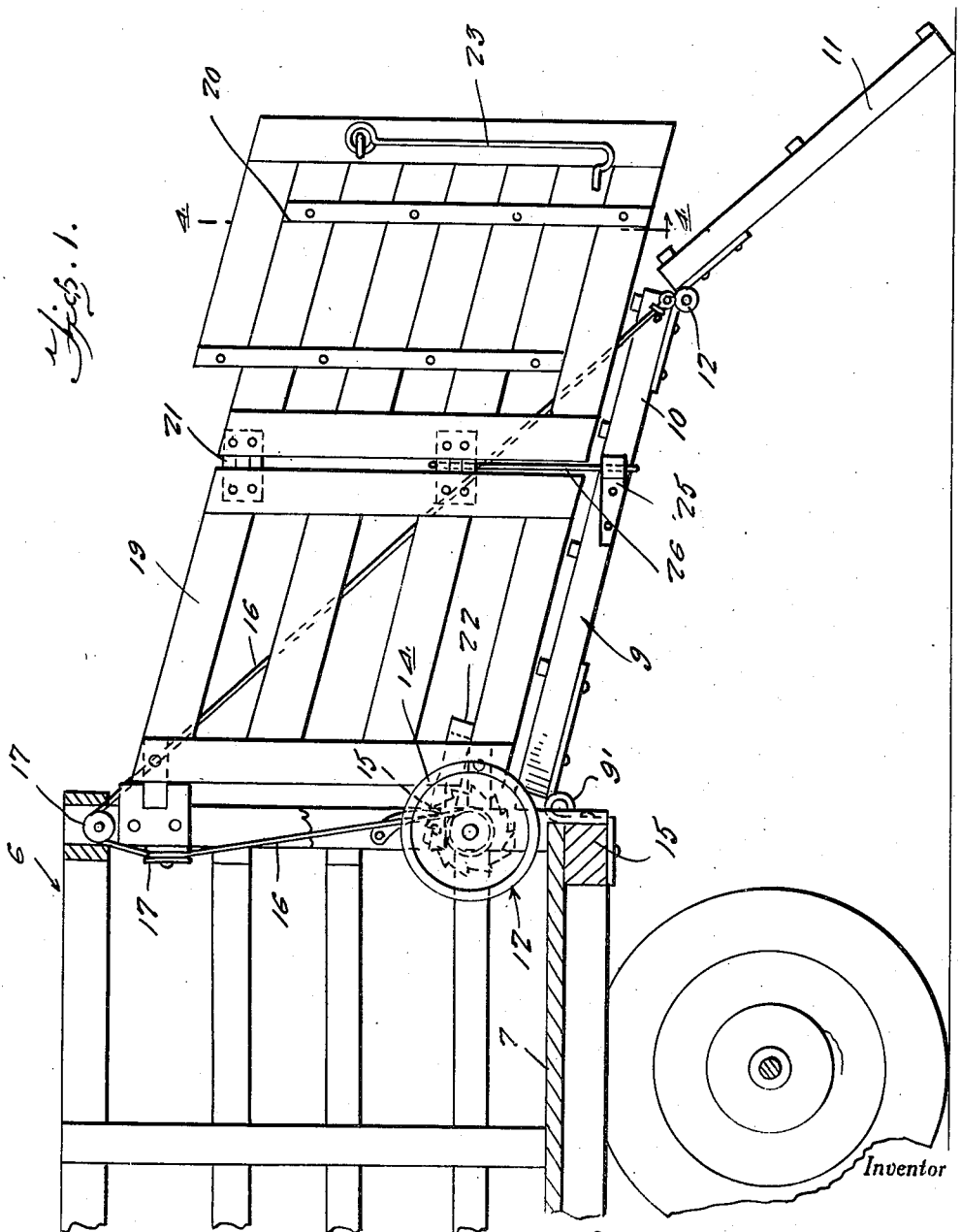

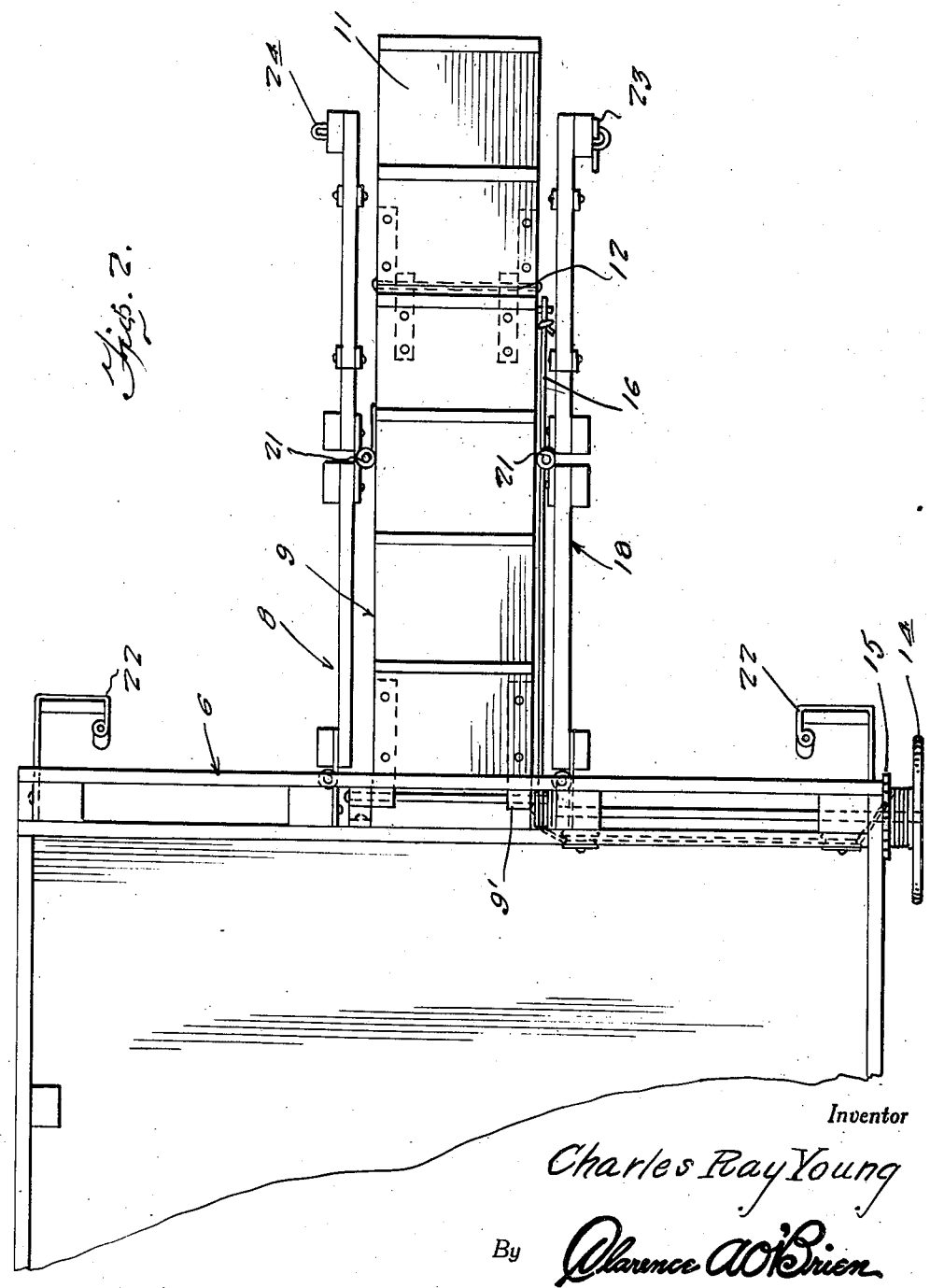

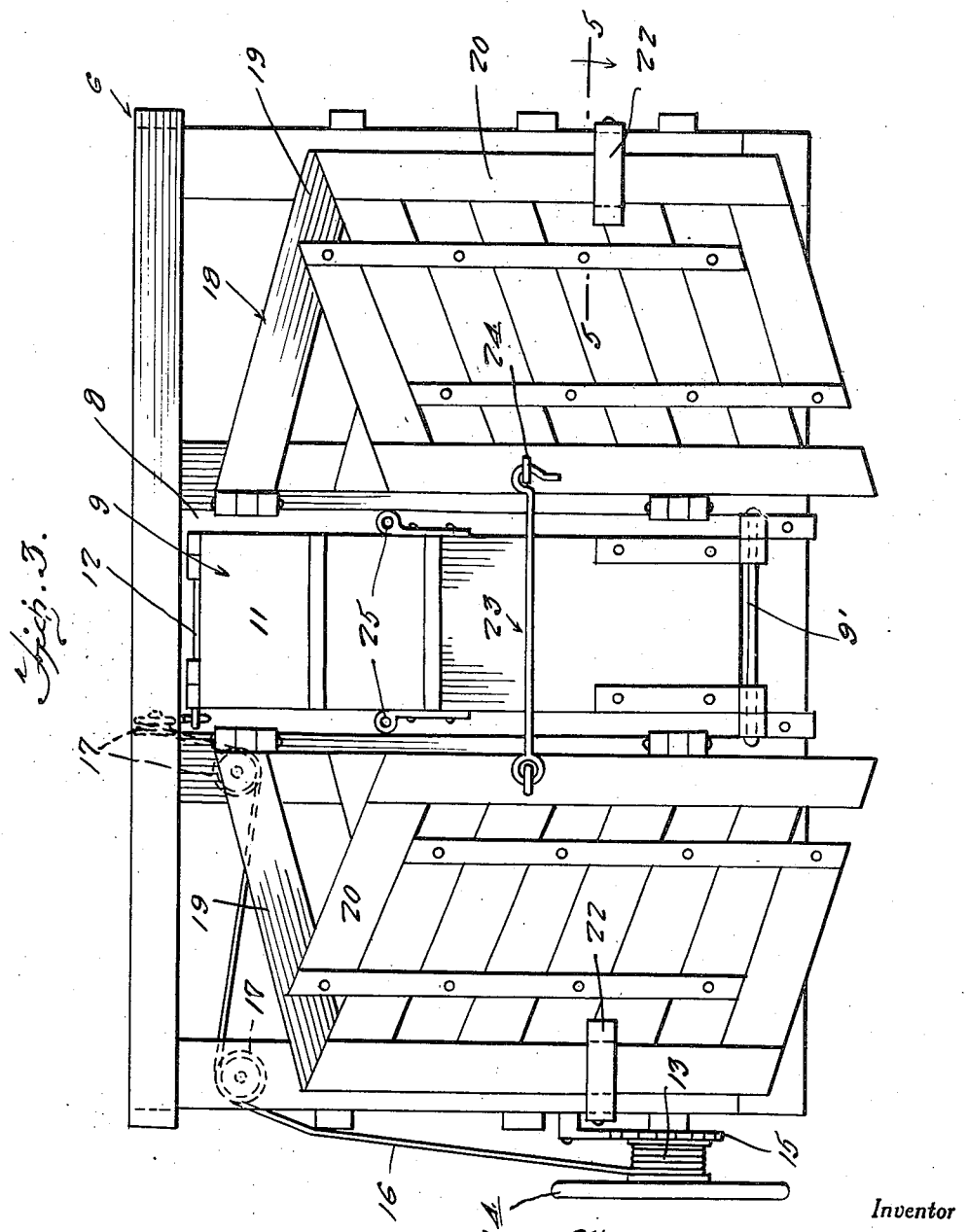

2,215,631

UNITED STATES PATENT OFFICE 2,215,631

STOCK LOADING AND UNLOADING DEVICE

Charles Ray Young, Scottsbluff, Nebr., assignor of one-half to H. C. Grave, Douglas, Wyo.

Application May 15, 1940, Serial No. 335,423

3 Claims. (Cl. 296—61)

This invention relates to stock loading and unloading devices especially adapted for motor trucks and other vehicles, and has for the primary object the provision of a device of this character which may be readily installed on the body of a motor truck to remain a part thereof as long as needed and may be readily brought into operative and inoperative positions and when in the operative position will permit loading and unloading of cattle from the truck with ease, quickness and safety and when in the inoperative position will consume a small space on the truck and will provide a closure for the entrance of the body and further may be easily adjusted so that the loading and unloading operations may be from the ground to the body or vice versa or from the truck body directly to another vehicle or conveyance.

With these and other objects in view, as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a fragmentary side elevation, partly in section, illustrating a loading and unloading device applied to a fragmentary portion of a motor truck.

Figure 2 is a fragmentary top plan view illustrating the device and part of the motor truck.

Figure 3 is a rear elevation showing the device in an inoperative position and mounted on a truck body.

Figure 4 is a sectional view taken on the line 4—4 of Figure 1.

Figure 5 is a sectional view taken on the line 5—5 of Figure 3.

Figure 6 is a fragmentary bottom plan view showing the hinge connection between the loading and unloading device and the truck body.

Figure 7 is a fragmentary detail sectional view illustrating a combined hinge and connecting means between the ramp member and one of the side guard members of the loading and unloading device.

Referring in detail to the drawings, the numeral 5 indicates a fragmentary portion of a motor vehicle in which a portion of the body is indicated by the character 6 and is of a construction to permit thorough ventilation for the stock when confined therein by having the vertical walls constructed of skeleton formation while the flooring, indicated by the character 7, is of solid formation. The rear vertical wall of the body 6 has an entrance 8 and hinged on the body at the lower end of the entrance is a ramp element 9 composed of sections 10 and 11 connected by a hinge 12 which will permit the section 11 to fold down on the section 10 when the latter is raised into a vertical position and when in the latter-named position will form a closure for the entrance 8.

An operating means 12 is provided for raising and lowering the ramp member and includes a drum 13 journaled on the body and equipped with a hand wheel 14 and a ratchet mechanism 15. A cable 16 is secured to and wound on the drum and feeds off of the drum over a plurality of pulleys 17 journaled on the body. The cable after leaving the pulleys is attached to the ramp member 9 where the sections thereof hinge together. Through this operating means it is possible to raise and lower the ramp member as desired. It will be seen that when the ramp member 9 is in an operative position for loading and unloading stock, that the section 11 will contact the ground at an acute angle to the section 10. However, when the ramp member 9 is employed for transferring stock from the motor vehicle to another vehicle the section 11 may be brought to rest on the conveyance and will assume the same plane as the section 10 so that the stock can readily walk from the motor vehicle to the conveyance.

Guard members 18 are hinged on the rear vertical wall of the truck body adjacent the entrance 8 and each is composed of sections 19 and 20 connected by hinges 21. The section 20 is adjustable as to length by being constructed of telescopic panel-like sections. The section 20 being adjustable as to length will permit the guard member to be extended the full length of the ramp member when the latter is in an operative position.

The guard members 18 being composed of the hingedly connected sections and telescopic sections may be readily collapsed or folded into compact positions against the rear vertical wall of the truck body at opposite sides of the entrance 8 when the device is not in use.

Spring fasteners 22 are mounted on the body 6 to engage with the guard members when folded to prevent them from moving accidentally out of inoperative position and further to prevent said guard members from banging against the truck body when the latter is in motion.

To further secure the guard members in inoperative position, an elongated hook 23 is pivoted to one of the guard members and engages a keeper 24 carried by the other guard member and also extends across the ramp member 9 when the latter is in an inoperative position to obviate any possibility of the ramp member descending or falling from an inoperative position.

From the foregoing description taken in connection with the accompanying drawings it will be seen that a very efficient, practical and compact loading and unloading device has been provided for a motor truck wherein it can be easily installed on the truck and remain a part thereof as long as needed and further may be easily brought into operative and inoperative position with the least amount of effort on the part of the operator and when in an inoperative position will permit the loading and unloading of stock with safety.

The section 10 of the ramp member 9 is provided with keepers 25 to be engaged by hinge pintles 26 of certain of the hinges 21 for the purpose of maintaining the guard members 18 in operative position with relation to the ramp member when the latter is in an operative position and which will permit the guard members to be easily and quickly separated from the ramp member and moved into inoperative or folded position against the rear of the truck body.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a device of the character described, a ramp member including hingedly connected sections, means for hinging one of the sections on a truck body adjacent an entrance thereof, a raising and lowering means carried by the truck body and connected to the ramp member whereby the latter may be lowered or raised and when in the latter-named position to close the entrance, sectional hingedly connected foldable guard members hingedly mounted on the truck body at opposite sides of the entrance and capable of being brought into position at opposite sides of the ramp member when in a lowered position, each of said guard members including a section of telescopic formation whereby the length of the guard member may be varied.

2. In a device of the character described, a ramp member including hingedly connected sections, means for hinging one of the sections on a truck body adjacent an entrance thereof, a raising and lowering means carried by the truck body and connected to the ramp member whereby the latter may be lowered or raised and when in the latter-named position to close the entrance, sectional hingedly connected foldable guard members hingedly mounted on the truck body at opposite sides of the entrance and capable of being brought into position at opposite sides of the ramp member when in a lowered position, each of said guard members including a section of telescopic formation whereby the length of the guard member may be varied, spring fasteners carried by the truck body to engage and secure the guard members in a folded position at opposite sides of the entrance, and a securing hook pivoted on one of the guard members and detachably connected to the other guard member and extending across the entrance and the ramp member when in entrance closing position.

3. In a device of the character described, a sectional ramp member hingedly mounted on a truck body adjacent an entrance thereof, a drum journaled on the truck body, a hand wheel for said drum, a ratchet mechanism connected with the drum and truck body, a cable secured to and wound on the drum, pulleys journaled on the truck body and having the cable trained thereover, said cable after leaving said pulleys being secured to the ramp member whereby the latter may be raised and lowered and when raised adapted to assume a position of closing the entrance, foldable guard members hinged on the truck body at opposite sides of the ramp member and the entrance and including sections, and hinges connecting the sections of the guard members and including means for detachably securing said guard members to the ramp member.

CHARLES RAY YOUNG.